Apr. 3, 1923.
E. R. HOLMES
MOTOR VEHICLE
Filed Jan. 31, 1920
1,450,292
2 sheets-sheet 2
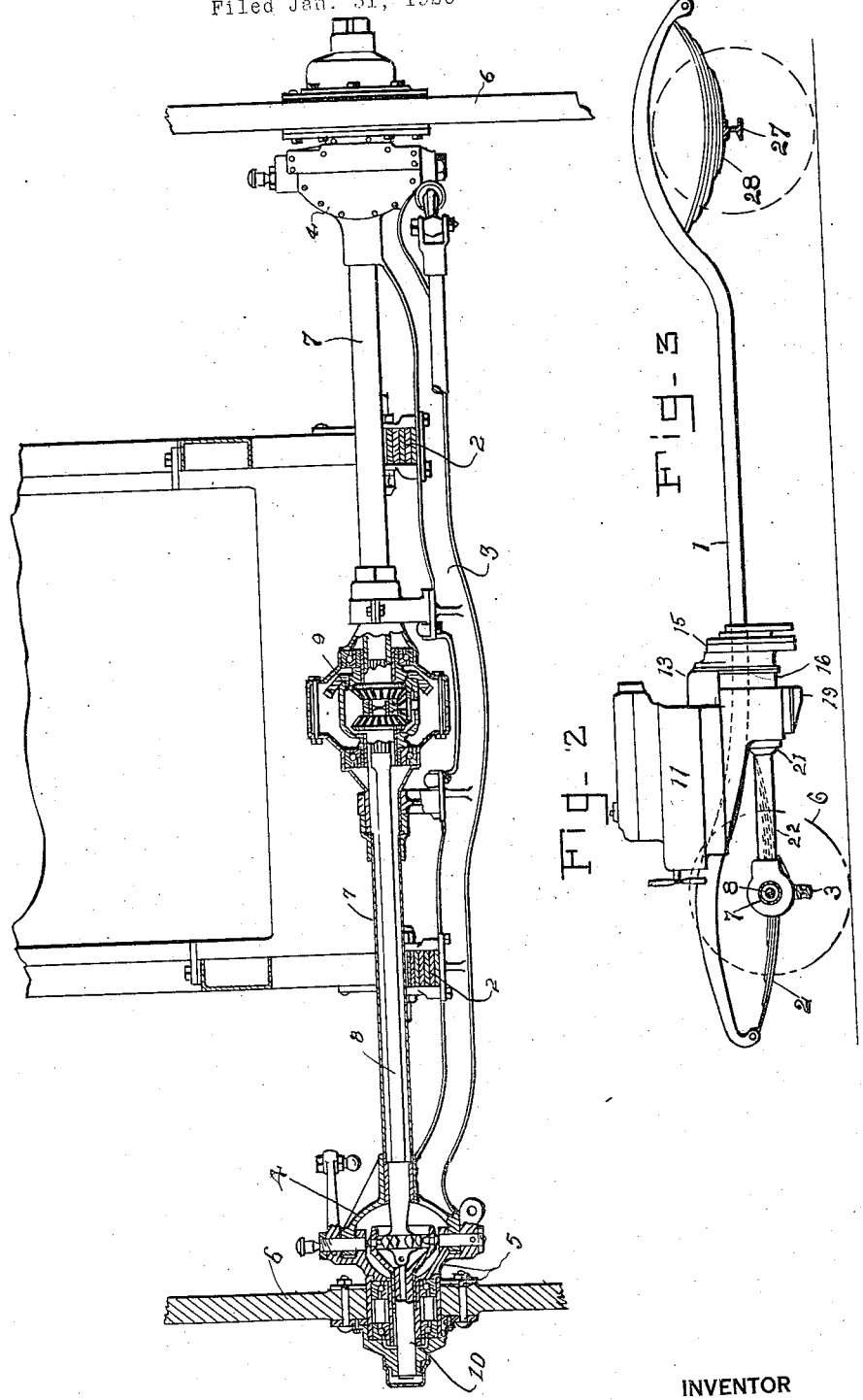
INVENTOR
Edgar R. Holmes
BY
ATTORNEY Patented Apr. 3, 1923.

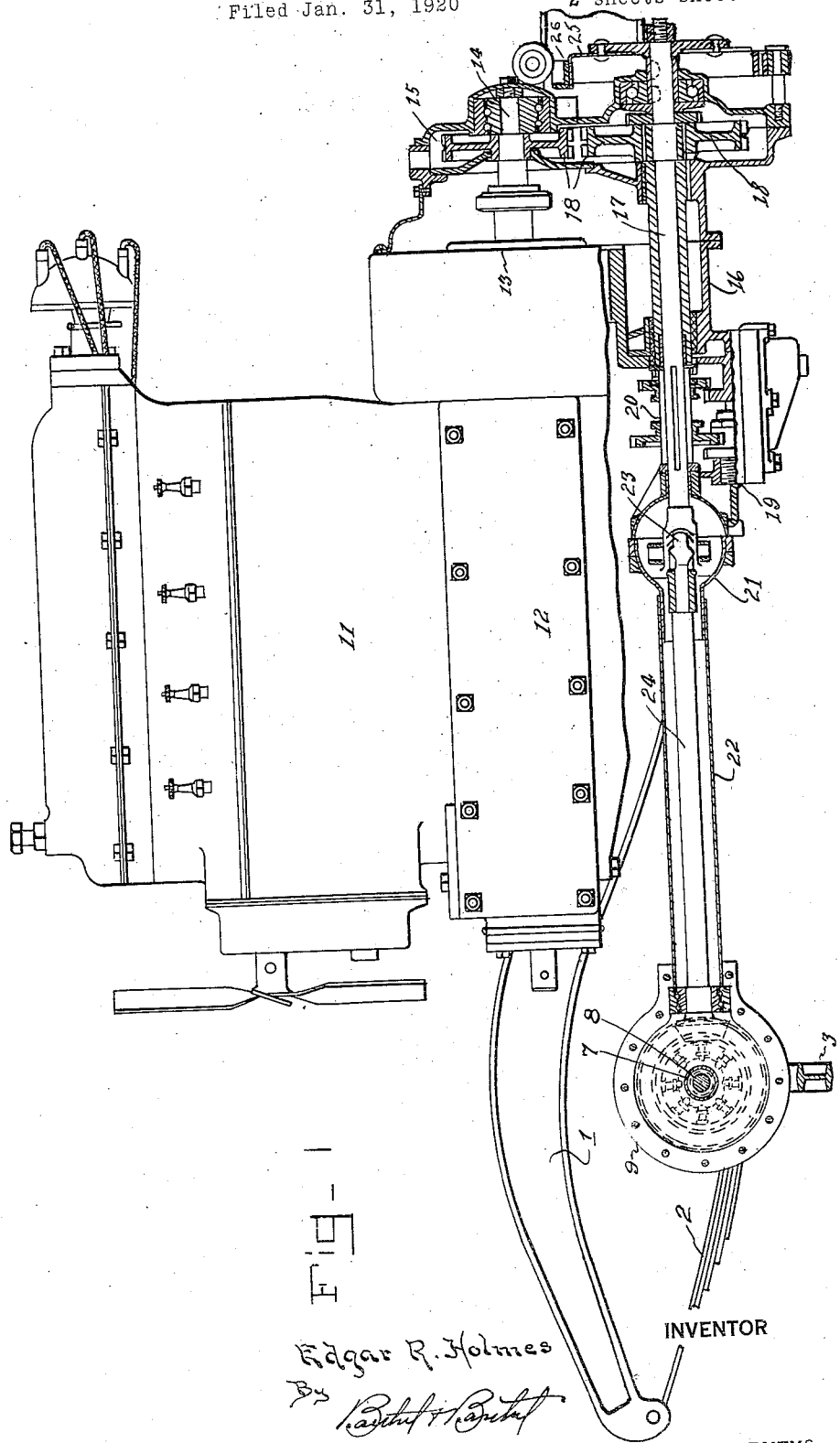

1,450,292

UNITED STATES PATENT OFFICE.

EDGAR R. HOLMES, OF DETROIT, MICHIGAN, ASSIGNOR TO HAMLIN-HOLMES MOTOR COMPANY, A CORPORATION OF DELAWARE.

MOTOR VEHICLE.

Application filed January 31, 1920. Serial No. 355,386.

*To all whom it may concern:*

Be it known that I, EDGAR R. HOLMES, a citizen of the United States of America, residing at Detroit, in the county of Wayne and State of Michigan, have invented certain new and useful Improvements in Motor Vehicles, of which the following is a specification, reference being had therein to the accompanying drawings.

In motor vehicle construction it has been the common practice to drive the rear ground wheels of the vehicle by power applied thereto by a motor mounted on the vehicle and it is also common practice to drive all four ground wheels of the vehicle by power from a motor mounted on the vehicle, but this invention contemplates the application of the power to the front steering wheels only of a four-wheeled motor vehicle, and it is the object of the invention to provide a novel construction and arrangement of the mechanism for transmitting power from a motor on a vehicle at its forward end, to the front traction wheels only of the vehicle.

A further object of the invention is to provide a unitary structure for the purpose including the power plant, change speed power transmitting mechanism, and motion transmitting means extending forwardly therefrom to the front axle of the vehicle. It is also an object of the invention to provide suitable braking means for checking the forward movement of the vehicle, which means is so arranged as to apply its braking power through the power transmitting means, to the front driving wheels of the vehicle in a very simple and efficient manner.

A further object is to provide certain other new and useful features in the construction, arrangement and combination of parts, all as hereinafter more fully described.

With the above and other ends in view the invention consists in the matters hereinafter described and more particularly pointed out in the appended claims, reference being had to the accompanying drawing, in which—

Figure 1 shows a portion of a motor vehicle chassis provided with a power plant and power transmitting mechanism, illustrative of the invention, in longitudinal vertical section and in operative relation to the power plant and front axle of the vehicle;

Fig. 2 is a front elevation of the front axle assembly partly in section, and

Fig. 3 is a diagrammatic view of a motor vehicle embodying the invention.

It is a well known fact that much less power is required to pull a vehicle than to push it. Prior constructions have ordinarily been such that the power of the engine has been applied to turn the rear traction wheels of the vehicle particularly pleasure vehicles, but it is known that when power is so applied and the road way is wet or slippery, the vehicle is very liable to side slip or skid and this is particularly true where brakes are applied to the rear wheels as it is practically impossible to apply the braking power equally to both wheels and it is very seldom that road conditions are the same beneath both wheels.

In the present invention it is proposed to apply driving power to the front wheels only of the vehicle, thus securing the advantages derived from pulling instead of pushing the vehicle and further avoiding the liability of skidding by eliminating the brakes from the rear wheels and providing an arrangement whereby the braking power is applied through the means for transmitting motion to the front wheels, said front wheels being provided with turning knuckles and means for transmitting motion to the wheels through said knuckles in any old and well known manner.

In the drawings, the reference numeral 1 denotes the chassis frame having its forward end articulated by springs 2 or other yieldable means to a front axle 3 and its rear end to a dead axle 27 by springs 28 the ends of said front axle being provided with steering knuckle housings 4, steering knuckles 5, and wheels 6.

On the axle 3 are casings 7 for wheel driving shafts 8 and the confronting ends of said shafts are operated by a differential mechanism 9 between the casings 7, said differential mechanism being of a conventional form. The wheel driving shafts 8 extend into the knuckle housings 4 and are in driving relation with wheel spindles 10 by which the wheels 6 are revolved, the driving relation being such that the wheels 6 may be simultaneously driven and steered, steering mechanism of the usual and well known type being provided.

Suitably mounted on the chassis or vehicle frame at the forward end thereof, adjacent the front axle, is a motor or power plant 11 of any suitable design and construction. The crank case 12 of the motor 11 is extended rearwardly to form a housing 13 for the usual fly wheel, clutch and other accessories ordinarily located contiguous to the motor. The crank shaft 14 of the motor extends rearwardly from the housing 13 into a power transmission housing 15 suitably supported from the housing and vehicle chassis. A casing 16 forms a depending part of the housing 13 and cooperates with the transmission housing 15 in supporting a longitudinal drive shaft 17 which is driven through the medium of a train of gears 18 associated with the shafts 14 and 17 in the housing 15, said housing providing suitable chambers for a lubricant for the train of gears.

A transmission casing 19 is formed integral with the lower part of the engine crank case and fly wheel casing and contains a conventional form of variable speed transmission mechanism 20 by which the drive shaft 17 may have variable speeds imparted thereto from the train of gears 18, the change speed mechanism including gears for different speeds and reverse and suitable controlling devices (not shown) extend to this change speed mechanism so that an automobile or similar vehicle may be operated and controlled in the usual manner.

Connecting the transmission casing 19 and the differential 9 is a universal joint casing 21 and a tubular housing 22 for a universal joint 23 and a driven shaft 24, said driven shaft transmitting power from the drive shaft 17 to the differential mechanism 9, with the universal joint permitting of the differential mechanism and the front axle moving relative to the drive shaft 17. This drive shaft cooperates with the driven shaft 24 in providing a longitudinal propeller shaft beneath the power plant 11 and in the central vertical plane thereof.

On the rear end of the drive shaft 17, outside of the housing 15, is a brake drum 25 for a brake band 26, said brake drum and brake band constituting a conventional form of brake mechanism controlled by pedals or levers (not shown) to exert a retarding action to the turning of the drive shaft 17 and through its connection with the front wheels of the vehicle, to arrest progress of the vehicle.

All of the housings and casings are constructed to afford unitary structures as far as possible and provision is made for efficient oiling of all movable and stationary wearing parts. A very compact arrangement of parts is secured through this construction and all the mechanism for driving the vehicle, including the power plant, change speed transmission, propeller shaft with its universal joint, and wheel driving shafts with the differential are all located at the forward end of the vehicle adding weight to said forward end, where it is supported to hold the front wheels to the roadway and also make all parts very accessible for replacing or repair.

Obviously, changes may be made in the construction and arrangements of parts within the scope of the appended claims, without departing from the spirit of the invention, and I do not, therefore, limit myself to the particular construction or arrangement shown.

What I claim is:—

1. In a motor vehicle wherein a chassis frame is supported upon a front axle by supporting springs, a live axle is carried by the front axle for transmitting motion to front supporting and steering wheels, and an engine is supported on the frame rearwardly of the front axle and provided with a downwardly extending crank case; means for transmitting motion from the rear end of the engine forwardly beneath said engine to the front axle including a propeller shaft operatively connected at its rear end with the rear end of the engine crank shaft and at its forward end to said axle, said propeller shaft including a universal joint, and a tubular member enclosing said propeller shaft and rigidly connected to the axle at its front end and having a universal connection at its rear end with the engine crank case to provide a radius member for taking the rearward thrust of the front axle.

2. In a vehicle having front steering wheels, a live front axle including differential mechanism, a power plant located rearwardly of the front axle and comprising an internal combustion engine provided with a crank case beneath the same and a housing at the rear end thereof into which the rear end of the engine crank shaft extends; means for transmitting motion from the rear end of the engine crank shaft forwardly to the differential mechanism of the front axle and comprising a power shaft mounted in bearings in said housing, gears in said housing operatively connecting said crank shaft and said power shaft, change speed power transmitting mechanism housed within a downward extension of the rear end of the engine crank case to receive oil therefrom, said power shaft forming a shaft of said change speed mechanism, a propeller shaft forming a forward extension of said power shaft and operatively connected thereto by a universal joint, a two-part universal joint housing one part of which is formed integral with the crank case extension and the other part of which is connected to said first part to move relatively thereto and form a tight closure for the universal joint, and a tube enclosing the propeller shaft and connected to and supported at its rear end by said movable part of the universal housing with its forward end rigidly connected to the front axle, said tube and universal joint housing forming a reach connection between the front axle and the lower part of the engine crank case to take the backward thrust on the front axle and permit a free up and down movement of said axle.

In testimony whereof I affix my signature in the presence of two witnesses.

EDGAR R. HOLMES.

Witnesses:
    LEWIS E. FLANDERS,
    KARL H. BUTLER.